(12) United States Patent
Yang et al.

(10) Patent No.: US 10,168,432 B2
(45) Date of Patent: Jan. 1, 2019

(54) DISTRIBUTED ELECTROMAGNETIC INSTRUMENT SYNCHRONIZATION SYSTEM AND METHOD

(71) Applicant: Institute of Geology and Geophysics, Chinese Academy of Sciences, Beijing (CN)

(72) Inventors: Yongyou Yang, Beijing (CN); Zhongxing Wang, Beijing (CN); Qingyun Di, Beijing (CN); Wenxiu Zhang, Beijing (CN); Binbin Chen, Beijing (CN); Renzhong Pei, Beijing (CN); Shujun Wu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/881,373

(22) Filed: Jan. 26, 2018

(65) Prior Publication Data
US 2018/0149756 A1    May 31, 2018

Related U.S. Application Data

(63) Continuation-in-part of application No. PCT/CN2017/091161, filed on Jun. 30, 2017.

(30) Foreign Application Priority Data

Jul. 1, 2016  (CN) .......................... 2016 1 0516010

(51) Int. Cl.
*G01S 19/24*   (2010.01)
*G04R 40/06*   (2013.01)
*G01S 19/23*   (2010.01)

(52) U.S. Cl.
CPC .............. *G01S 19/24* (2013.01); *G01S 19/23* (2013.01); *G04R 40/06* (2013.01)

(58) Field of Classification Search
CPC .......... G01S 19/24; G01S 19/30; G01S 19/29; G01S 19/37
(Continued)

(56) References Cited

U.S. PATENT DOCUMENTS 7,587,017 B2 * 9/2009 Smith .................... H03D 3/248
375/356
9,798,017 B2 * 10/2017 Zhodzishsky ........... G01S 19/04

FOREIGN PATENT DOCUMENTS

| CN | 101702033 A | 5/2010 |
| CN | 103091717 A | 5/2013 |
| CN | 103308951 A | 9/2013 |

OTHER PUBLICATIONS

Hong-Yuan Yang et al., "Data quality remote monitoring system for cable-less storage seismography based on Beidou",, Journal of Jilin Untiversity (Engineering and Technology Edition), vol. 45, No. 5, Sep. 2015.
(Continued)

*Primary Examiner* — Harry K Liu
(74) *Attorney, Agent, or Firm* — Novick, Kim & Lee, PLLC; Allen Xue

(57) ABSTRACT

A distributed electromagnetic method synchronization system and method involving a satellite communication and navigation system. The method includes the following steps: the transmitter and the receiver establish connection with the satellite respectively to realize the position and time synchronization; the transmitter and the receiver acquire the second-pulse-signal, and according to the second-pulse-signal to adjust their own temperature compensation crystal, so that the frequency reaches the preset value; in the field of operation, the transmitter and receiver through the satellite
(Continued)

mutual communication, timely adjustment of the operation process. In the above-mentioned way, the communication function can be set in one place to facilitate the timely adjustment of the data acquisition process so as to ensure the quality of the collected data and improve the efficiency of the field operation.

10 Claims, 3 Drawing Sheets

(58) Field of Classification Search
USPC .................................................. 342/357.63
See application file for complete search history.

(56) References Cited

OTHER PUBLICATIONS

Mingming Du et al., "GPS and TCXO Bisynchronous Transient Electronmagnetic Measureing Controller", Transactions of China Electrotechnical Society, vol. 23, No. 12, Dec. 2008.
Lijuan Chen, "Ground and air synchronization research of semi airborne electromagetic measurement system", Chengdu University of Technology, May 2015.

* cited by examiner

DISTRIBUTED ELECTROMAGNETIC INSTRUMENT SYNCHRONIZATION SYSTEM AND METHOD

TECHNICAL FIELD

The present disclosure relates to the technical field of field data acquisition, and particularly to a distributed electromagnetic instrument synchronization system and method involving a satellite communication and navigation system.

BACKGROUND

When a distributed electromagnetic instrument works, a transmitter generally transmits signals out, and transmits different frequency signals in different time periods in accordance with an established time parameter table. A plurality of receivers also set corresponding parameters in accordance with the same time parameter table, acquire the signals, and process and analyze the acquired signals. In general, the areas of operations where the transmitter and the receivers are located are at a distance of more than a few kilometers, the receivers are distributed in various places in accordance with a certain plan as well, without cables for connection and information interaction therebetween.

In order to synchronize the transmitter and the receivers in terms of actions, a method used currently is to configure GPS receivers on both the transmitter and the receivers, and perform a synchronization operation in accordance with GPS timing. Such a method has disadvantages that the time table used by the transmitter and receivers may be set only before the operation and may not be changed or adjusted once the operation has been started. However, in an actual field operation, measurement time required by different frequency signals is not identical due to different in-situ geologic characteristics of a work area. In order to obtain complete and high-quality data, it is necessary to set time of each frequency signal to be long enough when the time table is designed, and a current operation may be only stopped if parameters are changed or adjusted, which is not conducive to achieving high-efficiency operations.

Moreover, distributed electromagnetic instruments are often located in remote areas, and a public communication means is relatively backward or does not exist at all, which makes manual communication more difficult, and is not conducive to the performance of the above operation flow.

SUMMARY

The present disclosure provides a distributed electromagnetic instrument synchronization system and method using satellite communication and navigation, which can integrate timing, positioning and communication functions into a whole and facilitate timely adjustment of data so as to ensure the quality of the acquired data In order to realize the above-mentioned purpose, a technical solution employed by the present disclosure is to provide a distributed electromagnetic instrument synchronization method based on a satellite having both communication and navigation functions, e.g., the Beidou satellite, which includes the following steps: respectively establishing a connection with the satellite by a transmitter and a receiver to realize location positioning and time synchronization; acquiring second-pulse-signal by the transmitter and the receiver, and adjusting their own temperature-compensated crystal oscillators according to the second-pulse-signal so that their frequencies reach a preset value; and in a field operation process, performing mutual communication between the transmitter and the receiver through the satellite, and timely adjusting the operation process.

The step of realizing time synchronization includes: acquiring the second-pulse-signal, wherein a rising edge of the second-pulse-signal is a second starting time; respectively acquiring their own NMEA statements by the transmitter and the receiver, wherein the NMEA statements include latitude, elevation, time and velocity information; and respectively realizing time synchronization by the transmitter and the receiver according to their own NMEA statements and the second-pulse-signal.

The step of adjusting their own temperature-compensated crystal oscillators according to the second-pulse-signal includes:

respectively counting, by the receiver and the transmitter, signals output by their own temperature-compensated crystal oscillators, wherein the count value obtained within a pulse duration of N second-pulse-signal is n, and the frequencies of the temperature-compensated crystal oscillators are $F=n/N$ (Hz); and comparing the $F$ with its preset value, and adjusting adjustment control voltages of the temperature-compensated crystal oscillators according to an error so that the error between the output frequencies and the preset value is smaller than a preset threshold value.

The step of performing mutual communication between the transmitter and the receiver by the satellite includes:

a data acquisition step, namely, acquiring data by the receiver and calculating it within a particular frequency band, and evaluating the quality of the acquired data to determine whether a sufficient amount of data within the particular frequency band is acquired;

an evaluation step, namely, after the receiver completes the quality evaluation of the collected data, transmitting an evaluation result to the transmitter by the satellite;

an adjustment step, namely, after receiving messages of all the incoming network receivers, performing further analysis and determination by the transmitter, adjusting the power intensity of the transmitted signal and massively transmitting information of the time and the power intensity to all the receivers;

wherein the data acquisition step, the evaluation step, and the adjustment step are repeatedly executed so that the receiver acquires the data of the preset quality; and after signal transmission of one particular frequency band is completed, the transmitter makes an adjustment to change a transmission frequency, and transmits newly adjusted information to the receiver by using the satellite, and the receiver continues to acquire data.

The distributed electromagnetic instrument synchronization method based on the satellite further includes:

before the data is acquired, setting a parameter table, wherein the parameter table includes a frequency of the transmitted signal and its duration parameter information, and the receiver and the transmitter respectively store it for backup.

In order to solve the above technical problem, another technical solution employed by the present disclosure is to provide a distributed electromagnetic instrument synchronization system involving a satellite, which includes a transmitter, a receiver, a satellite and a ground controller, wherein the transmitter and the receiver respectively include a first transceiver module and a second transceiver module, and the first transceiver module and the second transceiver module respectively establish a connection with the satellite to realize location positioning and time synchronization of the transmitter and the receiver; the first transceiver module and the second transceiver module output a second-pulse-signal, respectively, the transmitter and the receiver respectively include a first main controller and a second main controller, the first main controller and the second main controller respectively acquire the second-pulse-signal and adjust temperature-compensated crystal oscillators of the transmitter and the receiver according to the second-pulse-signal, so that its frequencies reach a preset value; in a field operation process, the first transceiver module of the transmitter and the second transceiver module of the receiver are mutually communicated through the satellite, so that the operation process is timely adjusted.

The first main controller and the second main controller respectively acquire the second-pulse-signal, wherein a rising edge of the second-pulse-signal is a second starting time.

The first transceiver module and the second transceiver module output their own NMEA statements, respectively, and the NMEA statements include latitude, elevation, time, and velocity information.

The first main controller and the second main controller respectively acquire the NMEA statements output by the first transceiver module and the second transceiver module and realize time synchronization according to the acquired NMEA statements and the second-pulse-signal.

The transmitter and the receiver respectively include a first counter and a second counter, wherein the first counter and the second counter respectively count signals output by temperature-compensated crystal oscillators of the transmitter and the receiver, wherein the count value obtained within a pulse duration of N second-pulse-signal is n, and the frequencies, calculated by the first main controller and the second main controller, of the respective temperature-compensated crystal oscillators are $F=n/N$ (Hz); the F is compared with its preset value, and adjustment control voltages of the temperature-compensated crystal oscillators are adjusted according to an error so that the error between the output frequencies and the preset value is smaller than a preset threshold value.

The receiver further includes an acquisition module, wherein the acquisition module acquires data within a particular frequency band, the second main controller calculates it and evaluates the quality of the acquired data to determine whether a sufficient amount of data within the particular frequency band is acquired;

after the acquisition module completes the quality evaluation of the collected data, the second transceiver module transmits an evaluation result to the first transceiver module of the transmitter through the satellite;

the first transceiver module receives messages from all incoming receivers, the main controller makes further analysis and determination to adjust the power intensity of the transmitted signal, and the first transceiver module massively transmits information of the time and the power intensity to all the receivers;

the data is repeatedly acquired, the quality of the data is evaluated, and the power intensity of the transmitted signal is adjusted so that the receiver obtains data of the preset quality; and after signal transmission of one particular frequency band is completed, the first main controller of the transmitter makes an adjustment to change a transmission frequency, and the first transceiver module also transmits newly adjusted information to the receiver by using the satellite, and the receiver continues to acquire data.

Before the data is acquired, the ground controller sets a parameter table, wherein the parameter table includes a frequency of the transmitted signal and its duration parameter information, and the receiver and the transmitter respectively store it for backup.

The present disclosure has advantageous effects: in contrast to the prior art, the present disclosure provides a distributed electromagnetic instrument synchronization system and method using satellite communication and navigation, wherein the method includes the following steps: respectively establishing a connection with the satellite by a transmitter and a receiver to realize location positioning and time synchronization; acquiring second-pulse-signal by the transmitter and the receiver, and adjusting their own temperature-compensated crystal oscillators according to the second-pulse-signal so that their frequencies reach a preset value; and in a field operation process, performing mutual communication between the transmitter and the receiver through the satellite, and timely adjusting the operation process. Accordingly, the present disclosure can integrate timing, positioning and communication functions into a whole and facilitate timely adjustment of data so as to ensure the quality of the acquired data.

DETAILED DESCRIPTION

Figure 1:
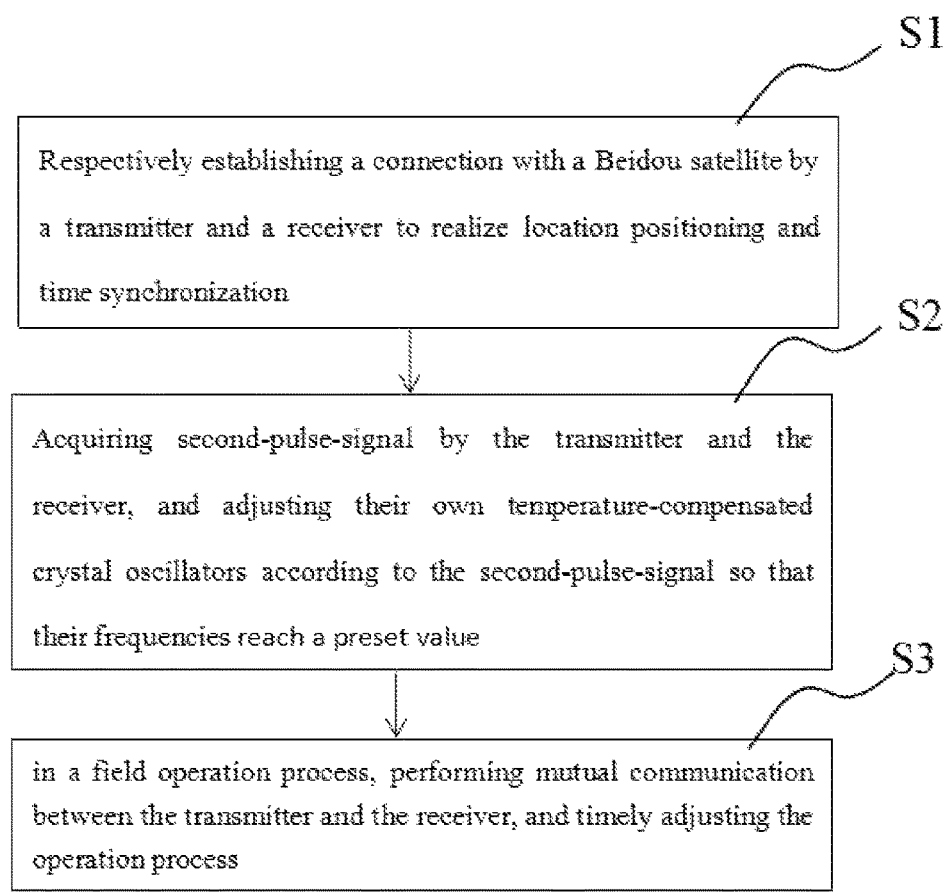
FIG. 1 is a flow diagram of a distributed electromagnetic instrument synchronization method according to an embodiment of the present disclosure.

With reference to FIG. 1, FIG. 1 is a flow diagram of a distributed electromagnetic instrument synchronization method using satellite communication and navigation, according to an embodiment of the present disclosure. As shown in FIG. 1, the method of the present embodiment includes the following steps:

S1. respectively establishing a connection with the satellite by a transmitter and a receiver to realize location positioning and time synchronization.

In this step, the transmitter and the receiver particularly establish a communication channel through a short message transmitting function of the satellite to establish a connection.

The step of realizing time synchronization particularly includes: firstly, acquiring second-pulse-signal, wherein a rising edge of the second-pulse-signal is a second starting time, with a precision reaching 40 nS; then, respectively acquiring their own NMEA statements by the transmitter and the receiver, wherein the NMEA statements include latitude, elevation, time and velocity information, the NMEA statements are output periodically in accordance with a certain time interval, and an output interval is preferably 1 second; and finally, respectively realizing time synchronization by the transmitter and the receiver according to their own NMEA statements and the second-pulse-signal. Time synchronization precisions of different transmitters and receivers may reach up to 40 nS.

S2. acquiring second-pulse-signal by the transmitter and the receiver, and adjusting their own temperature-compensated crystal oscillators according to the second-pulse-signal so that its frequencies reach a preset value.

This step particularly includes: firstly using the second-pulse-signal as a starting/stopping signal of counting; then respectively counting, by the receiver and the transmitter, signals output by their own temperature-compensated crystal oscillators, wherein the count value obtained within a pulse duration of N second-pulse-signal is n, and the frequencies of the temperature-compensated crystal oscillators are F=n/N (Hz); and finally comparing the F with its preset value, and adjusting adjustment control voltages of the temperature-compensated crystal oscillators according to an error so that the error between the output frequencies and the preset value is smaller than a preset threshold value.

S3. in a field operation process, performing mutual communication between the transmitter and the receiver through the satellite, and timely adjusting the operation process.

In this step, the transmitter is communicated with the receiver by the satellite according to a preset parameter.

This step particularly includes: a data acquisition step, an evaluation step and an adjustment step. Particularly, the data acquisition step includes: acquiring data by the receiver and calculating it within a particular frequency band, and evaluating the quality of the acquired data to determine whether a sufficient amount of data within the particular frequency band is acquired. The evaluation step includes: after the receiver completes the quality evaluation of the collected data, transmitting an evaluation result to the transmitter by the satellite. The adjustment step includes: after receiving messages of all the incoming network receivers, performing further analysis and determination by the transmitter, adjusting a power intensity of the transmitted signal and massively transmitting information of the time and the power intensity to all the receivers.

Furthermore, after signal transmission of one particular frequency band is completed, the transmitter makes an adjustment to change a transmission frequency, and transmits newly adjusted information to the receiver by using the satellite, and the receiver continues to acquire data. That is, the data acquisition step, the evaluation step, and the adjustment step continue to be performed until a preset measurement cycle is completed.

Before the data is acquired, a parameter table is further set, wherein the parameter table includes a frequency of the transmitted signal and its duration parameter information, and the receiver and the transmitter respectively store it for backup.

Figure 2:
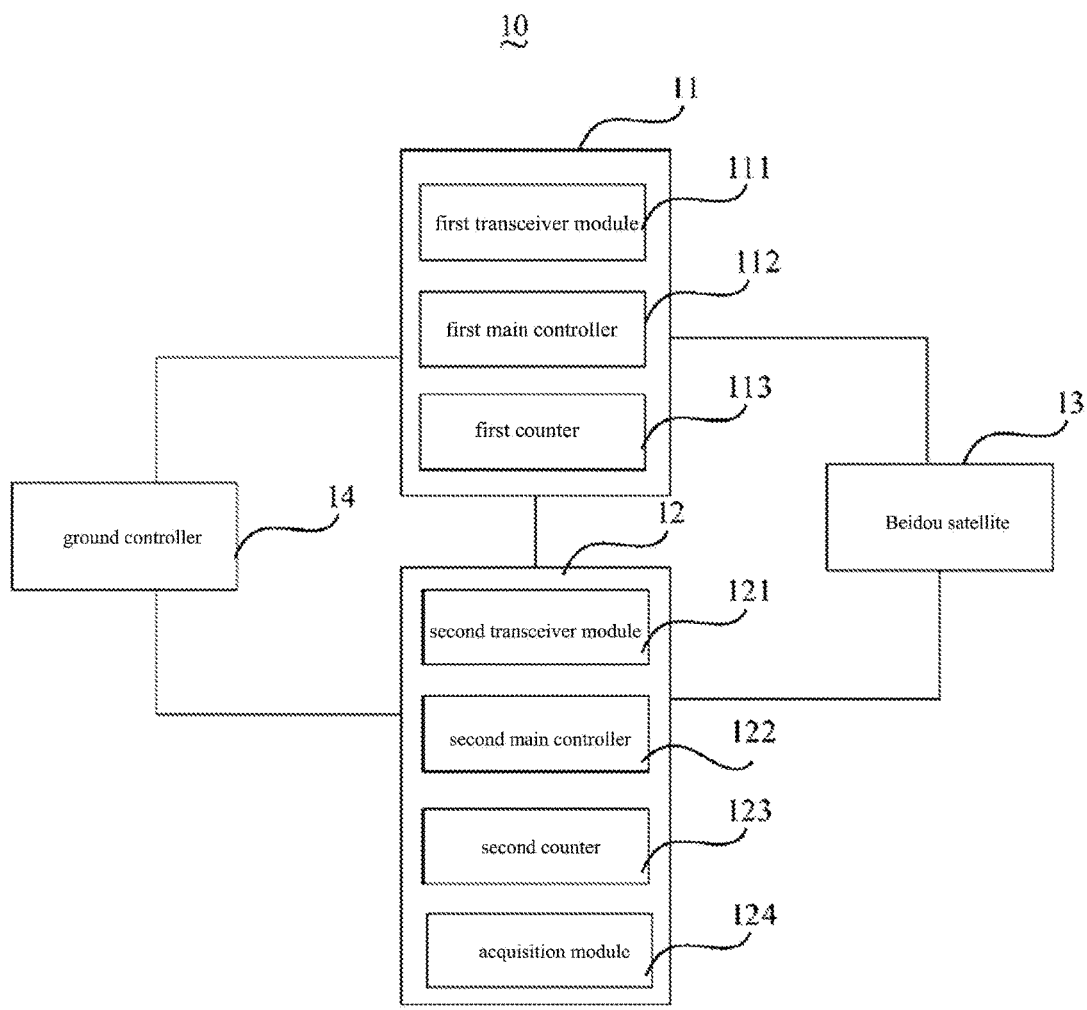
FIG. 2 is a schematic diagram showing a structure of a distributed electromagnetic instrument synchronization system according to an embodiment of the present disclosure.
Figure 3:
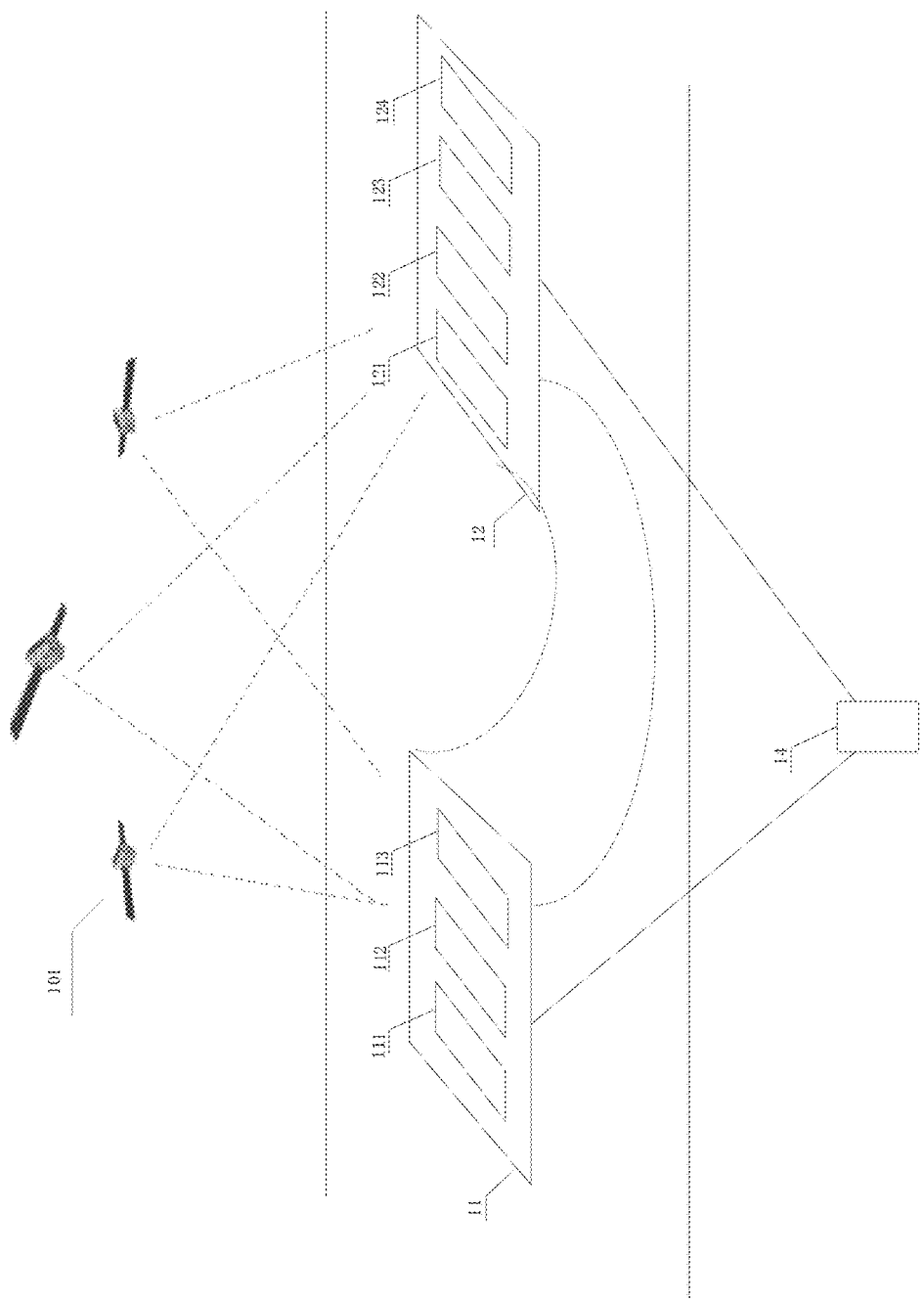
FIG. 3 is a schematic diagram showing the communications amongst the transmitter, the receiver, and the Beidou satellite according to an embodiment of the current disclosure.

With reference to FIG. 2, FIG. 2 is a schematic diagram showing a structure of a distributed electromagnetic instrument synchronization system involving a Beidou satellite according to an embodiment of the present invention. As shown in FIG. 2, the system 10 of the present embodiment includes a transmitter 11, a receiver 12, a Beidou satellite 13, and a ground controller 14, wherein the transmitter 11 includes a first transceiver module 111, a first main controller 112, and a first counter 113. The receiver 12 includes a second transceiver module 121, a second main controller 122, and a second counter 123.

The first transceiver module 111 and the second transceiver module 121 respectively establish a connection with the satellite 13 to realize location positioning and time synchronization of the transmitter 11 and the receiver 12, respectively.

Particularly, the first transceiver module 111 and the second transceiver module 121 are integrated as a client in instruments of a user, i.e., the transmitter 11 and the receiver 12. In the actual work, the first transceiver module 111 and the second transceiver module 121 act as a separate functional module to establish a communication channel with the satellite 13 to complete functions of satellite signal receiving, location and time information resolving, short message transceiver channel establishment and the like, and the separate functional module is connected with the main controllers via a common communication interface.

In the present embodiment, the first transceiver module 111 and the second transceiver module 121 periodically output their own NMEA statements in accordance with a certain time interval, preferably the output interval is 1 second. The NMEA statements include latitude and longitude, elevation, time, and velocity information. In addition, a separate IO port is used to output a second-pulse-signal, wherein a rising edge of the second-pulse-signal is a second starting time, with a precision reaching 40 nS.

The first main controller 112 and the second main controller 113 respectively acquire the second-pulse-signal and acquire the NMEA statements output from the first transceiver module 111 and the second transceiver module 121, and respectively realize time synchronization according to the acquired NMEA statements and the second-pulse-signal. Time synchronization precisions of different transmitters and receivers reach up to 40 nS.

Further, the first main controller 112 and the second main controller 122 respectively acquire the second-pulse-signal and adjust temperature-compensated crystal oscillators of the transmitter 11 and the receiver 12 according to the second-pulse-signal, so that its frequencies reach a preset value. Particularly, the second-pulse-signal serve as starting/stopping signals of counting of the counters, the first counter 113 and the second counter 123 respectively count signals output by temperature-compensated crystal oscillators of the transmitter 11 and the receiver 12, wherein the count value obtained within a pulse duration of N second-pulse-signal is n, and the frequencies, calculated by the first main controller 111 and the second main controller 121, of the respective temperature-compensated crystal oscillators are F=n/N (Hz); the F is compared with its preset value, and adjustment control voltages of the temperature-compensated crystal oscillators are adjusted according to an error so that the error between the output frequencies and the preset value is smaller than a preset threshold value.

In a field operation process, the first transceiver module 111 of the transmitter 11 and the second transceiver module 121 of the receiver 12 are mutually communicated through the Beidou satellite 13, so that the operation process is timely adjusted. Particularly, the first transceiver module 111 of the transmitter 11 is communicated with the second transceiver module 121 of the receiver 12 through the Beidou satellite. A particular communication process is as follows:

the receiver 12 further includes an acquisition module 124, wherein the acquisition module 124 acquires data within a particular frequency band, the second main controller 123 calculates it and evaluates the quality of the acquired data to determine whether a sufficient amount of data within the particular frequency band is acquired; after the acquisition module 124 completes the quality evaluation of the collected data, the second transceiver module 121 transmits an evaluation result to the first transceiver module 111 of the transmitter 11 through the Beidou satellite 13; the first transceiver module 111 receives messages from all incoming receivers 12, the first main controller 112 makes further analysis and determination to adjust the power intensity of the transmitted signal, and the first transceiver module 111 massively transmits information of the time and the power intensity to all the receivers 12; the data is repeatedly acquired, the quality of the data is evaluated, and the power intensity of the transmitted signal is adjusted so that the receiver obtains data of the preset quality; and after signal transmission of one particular frequency band is completed, the first main controller 112 of the transmitter 11 makes an adjustment to change a transmission frequency, and the first transceiver module 111 also transmits newly adjusted information to the receiver by using the Beidou satellite 13, and the receiver continues to acquire data.

Before the data is acquired, the ground controller 14 sets a parameter table, wherein the parameter table includes a frequency of the transmitted signal and its duration parameter information, and the receiver and the transmitter respectively store it for backup.

In view of the above, the present disclosure can integrate timing, positioning and communication functions into a whole. The receiver may immediately feed the results back to the transmitter, and the transmitter may timely make an adjustment so as to be higher in working efficiency, and ensures the quality of the acquired data.

The foregoing is merely illustrative of an embodiment of the present disclosure and is not intended to limit the patent scope of the present disclosure as a matter of limitation. Equivalent structures or equivalent flow transformations made by utilizing contents of the description and the drawings of the present disclosure are directly or indirectly applied to other related technical fields and included in a patent protective scope of the present disclosure.

The invention claimed is:

1. A distributed electromagnetic instrument synchronization method, wherein the instrument comprises a transmitter and a receiver, comprising:
    establishing a connection between the transmitter and the receiver via a satellite;
    realizing location positioning and time synchronization;
    the transmitter and the receiver each acquiring a pulse per second signal and each adjusting a temperature compensated crystal oscillator according to the pulse per second signal to reach a preset value; and
    performing communication between the transmitter and the receiver through the satellite.

2. The distributed electromagnetic instrument synchronization method according to claim 1, wherein the time synchronization comprises:
    acquiring the pulse per second signal, wherein a rising edge of the pulse per second signal is a starting time;
    the transmitter and the receiver acquiring a transmitter NMEA statement and a receiver NMEA statement, respectively, wherein the transmitter NMEA statement and the receiver NMEA statement each comprises latitude, elevation, time and velocity information; and
    the transmitter and the receiver realizing time synchronization with the pulse per second signal according to the transmitter NMEA statement and the receiver NMEA statement, respectively.

3. The distributed electromagnetic instrument synchronization method according to claim 1, wherein adjusting the temperature compensated crystal oscillator comprises:
    counting a signal output from the temperature compensated crystal oscillator, wherein a count value obtained within a pulse duration of N pulses per second signal is n, and a frequency of the temperature-compensated crystal oscillator is $F=n/N$ (Hz); and
    comparing the calculated F value with the preset F value, and adjusting an adjustment control voltage of the temperature-compensated crystal oscillator, when needed, so that a difference between the frequency of the temperature-compensated crystal oscillator and the preset F value is smaller than a preset threshold value.

4. The distributed electromagnetic instrument synchronization method according to claim 1, wherein performing communication between the transmitter and the receiver through the satellite comprises:
    a data acquisition step wherein the receiver acquires and calculates data within a first frequency band, and evaluates a quality of the acquired data to determine whether an amount of acquired data within the first frequency band is sufficient;
    an evaluation step, wherein after the receiver transmits an evaluation result to the transmitter through the satellite;
    an adjustment step, wherein the transmitter adjusts a power intensity of a transmitted signal and transmitting information of time and a power intensity to the receiver;
    wherein the data acquisition step, the evaluation step, and the adjustment step are repeatedly executed so that the acquired data is of sufficient quality; and
    the transmitter transmits signals to the receiver via the satellite in a second frequency band after transmission in the first frequency band is completed.

5. The distributed electromagnetic instrument synchronization method according to claim 1, further comprising:
    storing a parameter table in the receiver and the transmitter, wherein the parameter table comprises a frequency of a transmitted signal and a duration of a transmission.

6. A distributed electromagnetic instrument synchronization system, comprising a transmitter, a receiver, a satellite, and a ground controller, wherein the transmitter comprises a first transceiver module and the receiver comprises a second transceiver module, and the satellite connects to the first transceiver module and the second transceiver module,
    wherein the first transceiver module comprises a first main controller that acquires a pulse per second signal outputted by the first transceiver module and adjusts a temperature-compensated crystal oscillator in the transmitter so that a frequency of the transmitter reaches a preset value,
    wherein the second transceiver module comprises a second main controller that acquires a pulse per second signal outputted by the second transceiver module and adjusts a temperature-compensated crystal oscillator in the receiver so that a frequency of the receiver reaches a preset value,
    and
    the first transceiver module of the transmitter and the second transceiver module of the receiver communicates via the satellite.

7. The distributed electromagnetic instrument synchronization system according to claim 6,
    wherein the first transceiver module and the second transceiver module respectively outputs a NMEA statement and the NMEA statement comprises latitude, elevation, time, and velocity information,
    the first main controller acquires the NMEA statement outputted by the first transceiver module,
    the second main controller acquires the NMEA statement outputted by the second transceiver module, and
    realizing time synchronization according to the acquired NMEA statements and the pulse per second signal.

8. The distributed electromagnetic instrument synchronization system according to claim 6, wherein the transmitter and the receiver respectively comprises a first counter and a second counter, wherein the first counter and the second counter respectively counts signals output by a temperature-compensated crystal oscillator of the transmitter and a temperature-compensated crystal oscillator of the receiver.

9. The distributed electromagnetic instrument synchronization system according to claim 6, wherein the receiver further comprises an acquisition module that acquires data within a particular frequency band.

10. The distributed electromagnetic instrument synchronization system according to claim 6, wherein the ground controller sets a parameter table that comprises a frequency and a duration of the transmitted signal to be stored in the receiver and the transmitter respectively store.

* * * * *